United States Patent
Mok et al.

(10) Patent No.: US 9,000,086 B2
(45) Date of Patent: Apr. 7, 2015

(54) THERMALLY CURABLE RESIN COMPOSITION FOR PROTECTIVE FILM

(75) Inventors: Soon Chun Mok, Hwaseong-si (KR); Seung Hee Lee, Seoul (KR); Jong Hwi Hwang, Seoul (KR); Beom Su Park, Daejeon (KR); Sung Hyun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 237 days.

(21) Appl. No.: 13/181,142

(22) Filed: Jul. 12, 2011

(65) Prior Publication Data

US 2012/0010350 A1 Jan. 12, 2012

(30) Foreign Application Priority Data

Jul. 12, 2010 (KR) .................. 10-2010-0067078
Jun. 20, 2011 (KR) .................. 10-2011-0059707

(51) Int. Cl.
| | | |
|---|---|---|
| C08L 83/06 | (2006.01) |
| C09D 183/06 | (2006.01) |
| C08G 77/14 | (2006.01) |
| C09D 183/08 | (2006.01) |
| C08L 83/08 | (2006.01) |
| C08G 77/26 | (2006.01) |
| C08F 20/00 | (2006.01) |
| C08F 20/32 | (2006.01) |

(52) U.S. Cl.
CPC ............... *C08L 83/06* (2013.01); *C08G 77/14* (2013.01); *C09D 183/06* (2013.01)

(58) Field of Classification Search
CPC ....... C08L 83/06; C09D 183/06; C08G 77/14
USPC ........ 523/400, 466; 524/1, 80, 492, 500, 502, 524/506, 588, 858, 860, 863, 864; 528/10, 528/12, 21, 22, 25, 27, 33, 34, 38, 40, 403; 525/50, 474, 477; 549/215
See application file for complete search history.

(56) References Cited

U.S. PATENT DOCUMENTS

| | | | | |
|---|---|---|---|---|
| 6,277,481 | B1 * | 8/2001 | Sugino et al. .............. | 428/317.1 |
| 2004/0070041 | A1 * | 4/2004 | Obayashi et al. ............. | 257/437 |
| 2005/0208230 | A1 * | 9/2005 | Ikeda .............................. | 428/1.1 |
| 2006/0135723 | A1 * | 6/2006 | Nakayama .................... | 528/10 |
| 2008/0076900 | A1 * | 3/2008 | Oshimi et al. ................. | 528/43 |

FOREIGN PATENT DOCUMENTS

| | | | |
|---|---|---|---|
| JP | 07318702 A | * | 12/1995 |
| JP | 10-054979 A | | 2/1998 |
| JP | 11002819 A | * | 1/1999 |
| JP | 2004051876 A | * | 2/2004 |
| JP | 2004-256754 A | | 9/2004 |
| JP | 2005-338790 A | | 12/2005 |
| JP | 2008-088238 A | | 4/2008 |

* cited by examiner

*Primary Examiner* — Randy Gulakowski
*Assistant Examiner* — Ha Nguyen
(74) *Attorney, Agent, or Firm* — Rothwell, Figg, Ernst & Manbeck, P.C.

(57) ABSTRACT

The present invention relates to a thermally curable resin composition for a protective film including an alkoxy group-containing silane-modified epoxy resin as an essential component, a protective film of a color filter prepared from the same, and a liquid crystal display device including the same. The thermally curable resin composition for a protective film of the present invention includes an alkoxy group-containing silane-modified epoxy resin as an essential component to have excellent film strength and adhesive strength, and thus may be effectively used in a protective film of a color filter for a liquid crystal display device.

16 Claims, No Drawings

THERMALLY CURABLE RESIN COMPOSITION FOR PROTECTIVE FILM

CROSS-REFERENCE TO RELATED APPLICATIONS

This U.S. non-provisional patent application claims priority under 35 U.S.C. §119 to Korean Patent Application No. 10-2010-0067078, filed on Jul. 12, 2010 and Korean Patent Application No. 10-2011-0059707, filed on Jun. 20, 2011, the entire contents of which are hereby incorporated by reference.

BACKGROUND OF THE INVENTION

The present invention disclosed herein relates to a thermally curable resin composition for a protective film, including an alkoxy group-containing silane-modified epoxy resin as an essential component.

A color liquid crystal display device is treated with a solvent, an acid solution, or an alkali solution during preparation processes thereof, or the surface of the device is partially treated at a high temperature upon formation of a transparent electrode layer through a sputtering process. Occasionally, when the transparent electrode layer is etched to a desired shape, the above device is exposed to an acid solution or an alkali solution under severe conditions. In order to prevent damage to pixels due to heat or chemical material upon such treatment, a protective film, which consists of a thin film resistant to the above treatment, is provided.

Along with the trend of enlarging display devices such as liquid crystal displays (LCDs), the size of a substrate used is also being increasing. Accordingly, the color filter layer should be planarized, and the development of materials for a protective film for planarization of the color filter layer is essential in order to achieve a large area LCD.

Although compositions for a protective film are classified into a UV type using ultraviolet light and a thermally curable type according to the curing method, the thermally curable type is usually used because there is a limitation in performing UV irradiation with one shot according to an increase in the LCD area.

Since a composition for a protective film is coated entirely over a substrate unlike materials for color filters and is in contact with glass positioned outside the substrate, a color filter layer in the lower portion, and a column spacer in the upper portion or an ITO electrode, it is essential to secure adhesive strength between upper and lower layers.

In addition, although the strength of a protective film is also emerging as an important physical property due to increased LCD area, the development of a composition for a protective film, which may secure the strength of the protective film and the adhesive strength at the same time, is urgently needed because the two physical properties are inversely proportional to each other.

SUMMARY OF THE INVENTION

The present invention provides a thermally curable resin composition for a protective film, which maintains the film strength required for a protective film and has excellent adhesive strength.

The present invention also provides a protective film prepared from the thermally curable resin composition for a protective film.

The present invention also provides a liquid crystal display device further including the protective film.

Embodiments of the present invention provide alkoxy group-containing silane-modified epoxy resins essentially included in thermally curable resin compositions for a protective film of the present invention, including about 0.5 to about 30% by weight of an alkoxy group-containing silane-modified epoxy resin obtained by reacting an epoxy compound having a silyl group represented by Formula 1 with an alkoxy silane represented by Formula 2 based on a total weight of a solid content:

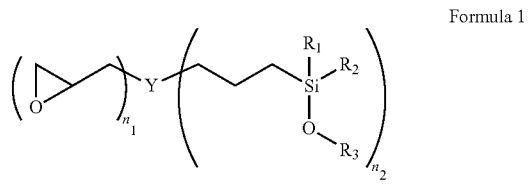

Formula 1

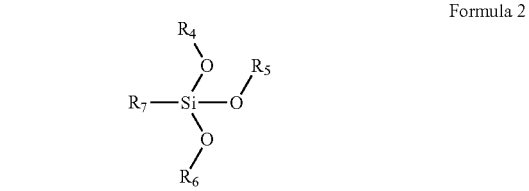

Formula 2

$R_1$ and $R_2$ are the same or different, and $C_1$ to $C_6$ alkyl groups or $C_1$ to $C_6$ alkoxy groups, $R_3$, $R_4$, $R_5$, and $R_6$ are the same or different, and $C_1$ to $C_6$ alkyl groups, and $R_7$ is one selected from the group consisting of a $C_1$ to $C_6$ alkyl group, a $C_2$ to $C_6$ vinyl group, a $C_2$ to $C_6$ vinyl alkyl group, a $C_1$ to $C_6$ mercapto alkyl group, and a $C_6$ to $C_{12}$ aryl group, Y is N or O, if the Y is N, $n_1$ and $n_2$ are each 1 or 2, and $n_1+n_2=3$, if the Y is O, $n_1$ and $n_2$ are each 1.

If the Y in Formula 1 is N, the epoxy compound having a silyl group represented by Formula 3. If the Y in Formula 1 is O, the epoxy compound having a silyl group represented by Formula 4.

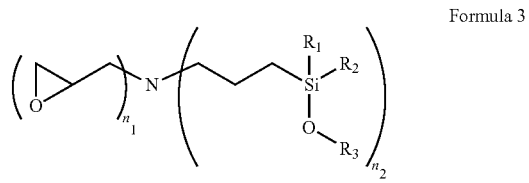

Formula 3

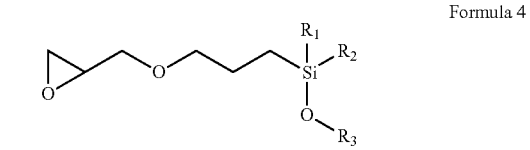

Formula 4

$R_1$ and $R_2$ are the same or different, and $C_1$ to $C_6$ alkyl groups or $C_1$ to $C_6$ alkoxy groups, $R_3$ is a $C_1$ to $C_6$ alkyl groups, $n_1$ and $n_2$ are each 1 or 2, and $n_1+n_2=3$.

The alkoxy group-containing silane-modified epoxy resin is appropriately prepared by mixing the epoxy compound having a silyl group with the alkoxy silane at a weight ratio of about 5:1 to about 1:1, and preferably about 5:1 to about 3:1.

The alkoxy group-containing silane-modified epoxy resin may have a weight average molecular weight of about 1,000 to about 10,000 in terms of polystyrene standards.

The epoxy compound having a silyl group represented by Formula 4 may be one or more selected from the group consisting of 3-glycidoxypropyltrimethoxysilane, 3-glycidoxypropyltriethoxysilane, 3-glycidoxypropylmethyldimethoxysilane, 3-glycidoxypropylmethyldiethoxysilane, 3,4-epoxycyclohexylethyltrimethoxysilane and 3,4-epoxycyclohexylethyltriethoxysilane, but it is not limited thereto.

The epoxy compound having a siyl group represented by Formula 3 may be one or more selected from the group consisting of 3-(N,N-diglycidyl)aminopropyltrimethoxysilane, N-glycidyl-N,N-bis[3-(methyldimethoxysilyl)propyl]amine, and N-glycidyl-N,N-bis[3-(trimethoxysilyl)propyl]amine, but it is not limited thereto.

The alkoxy silane represented by Formula 2 may be one or more selected from the group consisting of methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, phenyltrimethoxysilane, phenyltriethoxysilane, vinyltrimethoxysilane, vinyltriethoxysilane, 3-mercaptopropyltrimethoxysilane, and 3-mercaptopropyltriethoxysilane, or a partial condensate thereof, but it is not limited thereto.

The thermally curable resin composition for a protective film may further include a binder resin and a solvent.

The binder resin is a copolymer of an epoxy group-containing unsaturated compound, an ethylenic unsaturated compound, and other polymerizable monomers as optional compounds.

The epoxy group-containing unsaturated compound may be an aliphatic epoxy group-containing unsaturated compound selected from the group consisting of allyl glycidyl ether, glycidyl 5-norbornene-2-methyl-2-carboxylate (endo and exo mixtures), 1,2-epoxy-5-hexene, 1,2-epoxy-9-decene, glycidyl(meth)acrylate, glycidyl α-ethyl(meth)acrylate, glycidyl α-n-propyl(meth)acrylate, glycidyl α-n-butyl(meth)acrylate, 3,4-epoxybutyl(meth)acrylate, 4,5-epoxypentyl(meth)acrylate, 5,6-epoxyheptyl(meth)acrylate, 6,7-epoxyheptyl α-ethylacrylate, and methylglycidyl (meth)acrylate; or an alicyclic epoxy group-containing unsaturated compound selected from the group consisting of compounds represented by the following Formulas 4 to 6; or a mixture thereof, but it is not limited thereto.

Formula 5

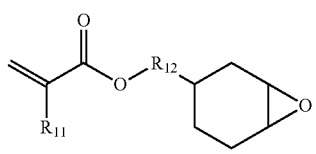

Formula 6

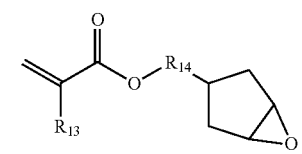

Formula 7

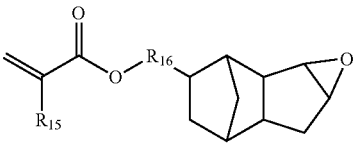

$R_{11}$, $R_{13}$, and $R_{15}$ are the same or different, and hydrogen atoms or $C_1$ to $C_6$ alkyl groups, and $R_{12}$, $R_{14}$, and $R_{16}$ are the same or different, and $C_1$ to $C_6$ alkylenes.

The ethylenic unsaturated compound may further include one or more functional groups selected from the group of a hydroxyl group, a silyl group, a functional group exhibiting the acidity by hydrolysis, a carboxylic group, and a carboxylic acid anhydride group.

Examples of the ethylenic unsaturated compound including a hydroxyl group may include 2-hydroxyethyl (meth)acrylate.

Examples of the ethylenic unsaturated compound including a silyl group may include vinyltrialkoxysilanes such as vinyltriethoxysilane, and the like, or (meth)acryloxysilanes such as vinyltris(β-methoxyethoxy)silane, methylvinyldimethoxysilane, β-(meth)acryloxyethyltrimethoxysilane, β-(meth)acryloxyethyltriethoxysilane, 3-(meth)acryloxypropyltrimethoxysilane, 3-(meth)acryloxypropyltriethoxysilane, γ-(meth)acryloxypropylmethyldimethoxysilane, γ-(meth)acryloxypropyldimethylmethoxysilane, γ-(meth)acryloxypropylmethyldiethoxysilane, 3-(meth)acryloxypropyldimethylethoxysilane, 3-(meth)acryloxypropyltrimethoxysilane, and the like.

Examples of the ethylenic unsaturated compound including an functional group exhibiting the acidity by hydrolysis may include tetrahydro-2H-pyran-2-yl (meth)acrylate, t-butyl(meth)acrylate, and the like.

Examples of the ethylenic unsaturated compound including a carboxylic group may include (meth)acrylic acid, crotonic acid, itaconic acid, maleic acid, fumaric acid, monomethyl maleic acid, isoprene sulfonic acid, styrene sulfonic acid, norbornene-2-carboxylic acid, and the like.

Examples of the ethylenic unsaturated compound including an acid anhydride group may include (meth)acrylic anhydride, crotonic anhydride, itaconic anhydride, maleic anhydride, fumaric anhydride, monomethyl maleic anhydride, isoprene sulfonic acid anhydride, styrene sulfonic acid anhydride, norbornene-2-carboxylic acid anhydride, and the like.

As the other polymerizable monomers, monomers known in the art may be used without limitation as long as they are monomers which are polymerizable with the epoxy group-containing unsaturated compound or the ethylenic unsaturated compound, and non-limiting examples may include benzyl (meth)acrylate, phenyl (meth)acrylate, cyclohexyl (meth)acrylate, methyl (meth)acrylate, ethyl (meth)acrylate, n-butyl (meth)acrylate, 2-ethylhexyl (meth)acrylate, dicyclopentanyl (meth)acrylate, caprolactone modified (meth)acrylate, styrene, 4-methoxystyrene, 4-methylstyrene, 1,3-butadiene, isoprene, and the like.

The binder resin may have a weight average molecular weight (Mw) of about 2,000 to about 100,000 in terms of polystyrene standards.

The solvent may include one or more selected from the group consisting of methylethylketone, cyclohexanone, tetrahydrofuran, methyl cellosolve acetate, ethyl cellosolve acetate, ethylene glycol butyl ether acetate, propylene glycol methyl ether acetate, propylene glycol ethyl ether acetate, propylene glycol propyl ether acetate, butyl cellosolve, 2-methoxyethyl ether, ethylene glycol ethyl methyl ether, ethylene glycol diethyl ether, ethyl acetate, ethyl lactate, and ethyl 3-ethoxypropionate, but it is not limited thereto.

The thermally curable resin composition for a protective film may further include one or more other additives selected from the group consisting of a polyfunctional monomer, an adhesion aiding agent, a surfactant, and a thermal polymerization inhibitor.

A solid of the thermally curable resin composition for a protective film may be present in an amount of about 1 to about 60% by weight, and preferably about 5 to about 40% by weight particularly in terms of coatability.

The present invention provides a one-component type thermally curable resin composition for a protective film.

The present invention provides a protective film of a color filter formed from the thermally curable resin composition for a protective film.

The present invention additionally provides a liquid crystal display device including the protective film of a color filter.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

The present invention relates to a thermally curable resin composition for a protective film, including an alkoxy group-containing silane-modified epoxy resin.

A protective film formed from the thermally curable resin composition for a protective film is frequently used in an overcoat of a typical color filter, and the overcoat is positioned between a color filter layer and a column spacer or an ITO electrode in structure. Therefore, a protective film used in an overcoat should have excellent adhesive strength with glass outside a substrate, a color filter layer in the middle of the substrate, and a column spacer or an ITO electrode, and have an excellent strength of the film at the same time.

The adhesive strength of the protective film and the film strength are inversely proportional, and thus it is difficult to enhance the two physical properties. In the present invention, these problems are to be solved by using the thermally curable resin composition for a protective film, including an alkoxy group-containing silane-modified epoxy group.

When an alkoxy group-containing silane-modified epoxy resin of the present invention is included in a thermally curable resin composition for a protective film, the adhesive strength of a protective layer formed from the composition may be secured at the same time while the film strength of the protective film and other physical properties are being maintained. It is due to the fact that the alkoxy group-containing silane-modified epoxy resin includes two functional groups of an alkoxy group and an epoxy group to chemically combine with a binder resin included in the thermally curable resin composition for a protective film and allow an acid to initiate a condensation reaction with the binder, forming a chemical bond with a substrate placed at the upper and lower portion.

In addition, the alkoxy group-containing silane-modified epoxy resin has a larger molecular weight than those of typical adhesion aiding agents, and thus the adhesive strength between a thermally curable protective film and layers at the upper and lower portions may be improved while the film strength of the binder resin included in the thermally curable resin composition for a protective film is being maintained.

The alkoxy group-containing silane-modified epoxy resin according to the present invention is obtained by any one of the following two selectable reactions.

A first reaction is a reaction of an epoxy compound having a silyl group represented by the following Formula 1 with an alkoxy silane represented by Formula 2, and the alkoxy group-containing silane-modified epoxy resin may be obtained through this.

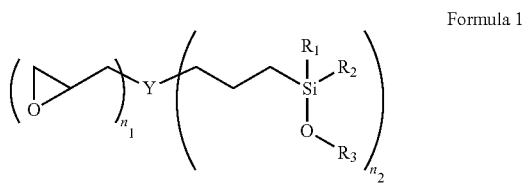

Formula 1

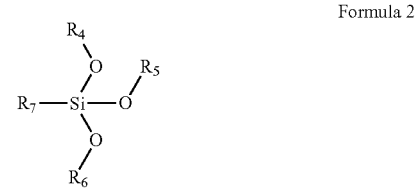

Formula 2

$R_1$ and $R_2$ are the same or different, and a $C_1$ to $C_6$ alkyl groups or $C_1$ to $C_6$ alkoxy groups, $R_3$, $R_4$, $R_5$, and $R_6$ are the same or different, and C1 to C6 alkyl groups, and $R_7$ is one selected from the group consisting of a $C_1$ to $C_6$ alkyl group, a $C_2$ to $C_6$ vinyl group, a $C_2$ to $C_6$ vinyl alkyl group, a $C_1$ to $C_6$ mercapto alkyl group, and a $C_6$ to $C_{12}$ aryl group, Y is N or O, if the Y is N, $n_1$ and $n_2$ are each 1 or 2, and $n_1+n_2=3$, if the Y is O, $n_1$ and $n_2$ are each 1.

If the Y in Formula 1 is N, the epoxy compound having a silyl group represented by Formula 3. If the Y in Formula 1 is O, the epoxy compound having a silyl group represented by Formula 4.

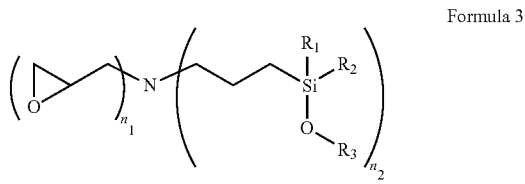

Formula 3

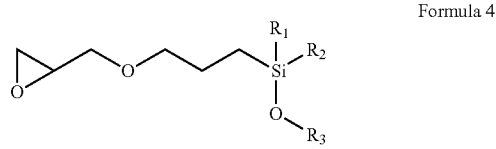

Formula 4

$R_1$ and $R_2$ are the same or different, and $C_1$ to $C_6$ alkyl groups or $C_1$ to $C_6$ alkoxy groups, $R_3$ is a $C_1$ to $C_6$ alkyl groups, $n_1$ and $n_2$ are each 1 or 2, and $n_1+n_2=3$.

The alkoxy group-containing silane-modified epoxy resin is included in an amount of preferably about 0.5 to about 30% by weight based on a total solid of a thermally curable resin composition for a protective film including the epoxy resin for enhancing the transmittance and adhesive strength of the protective film, and more preferably the alkoxy group-containing silane-modified epoxy resin is included in an amount of about 0.5 to about 20% by weight based on the total solid, and most preferably in an amount of about 1 to about 15% by weight.

The alkoxy group-containing silane-modified epoxy resin according to the present invention is obtained through an alcohol condensation reaction of the epoxy compound having a silyl group with the alkoxy silane, and has characteristics that various physical properties may be realized by a ratio of the two compounds.

In terms of storage stability and easiness in synthesis, the epoxy compound having a silyl group is mixed with the alkoxy silane at a weight ratio of preferably about 5:1 to about 1:1, and more preferably at a weight ratio of about 5:1 to about 3:1.

The alkoxy group-containing silane-modified epoxy group according to the present invention has a weight average molecular weight in a range of about 1,000 to about 10,000, and the compatibility with the binder and the adhesive strength enhancing effects are exhibited in this range.

The epoxy compound having a silyl group represented by Formula 4 may be used without limitation as long as it is typically used in the art, and non-limiting examples of the compound may include one selected from the group consisting of 3-glycydoxypropyltrimethoxysilane, 3-glycydoxypropyltriethoxysilane, 3-glycydoxypropylmethyldimethoxysilane, 3-glycydoxypropylmethyldiethoxysilane, 3,4-epoxycyclohexylethyltrimethoxysilane, and 3,4-epoxycyclohexylethyltriethoxysilane.

The epoxy compound having a silyl group represented by Formula 3 may be used without limitation as long as it is typically used in the art, and non-limiting examples of the compound may include one selected from the group consisting of 3-(N,N-diglycidyl)aminopropyltrimethoxysilane, N-glycidyl-N,N-bis[3-(methyldimethoxysilyl)propyl]amine, and N-glycidyl-N,N-bis[3-(trimethoxysilyl)propyl]amine.

The alkoxy silane represented by Formula 2 may be used without limitation as long as it is typically used in the art, and non-limiting examples of the compound may include one or more alkoxy silanes selected from the group consisting of methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, phenyltrimethoxysilane, phenyltriethoxysilane, vinyltrimethoxysilane, vinyltriethoxysilane, 3-mercaptopropyltrimethoxysilane, and 3-mercaptopropyltriethoxysilane, or a partial condensate thereof.

The thermally curable resin composition for a protective film according to the present invention includes an alkoxy group-containing silane-modified epoxy resin, a binder resin, and a solvent, and may include other additives if necessary.

The binder resin is a copolymer of an epoxy group-containing unsaturated compound, an ethylenic unsaturated compound, and other polymerizable monomers as optional compounds.

The epoxy group-containing unsaturated compound may be used without limitation as long as it is typically used in the art, and non-limiting examples of the compound may include an aliphatic epoxy group-containing unsaturated compound selected from the group consisting of allyl glycidyl ether, glycidyl 5-norbornene-2-methyl-2-carboxylate (endo and exo mixtures), 1,2-epoxy-5-hexene, 1,2-epoxy-9-decene, glycidyl(meth)acrylate, glycidyl α-ethyl(meth)acrylate, glycidyl α-n-propyl(meth)acrylate, glycidyl α-n-butyl(meth)acrylate, 3,4-epoxybutyl(meth)acrylate, 4,5-epoxypentyl(meth)acrylate, 5,6-epoxyheptyl(meth)acrylate, 6,7-epoxyheptyl α-ethylacrylate, and methylglycidyl (meth)acrylate; or an alicyclic epoxy group-containing unsaturated compound represented by the following Formulas 4 to 6; or a mixture thereof.

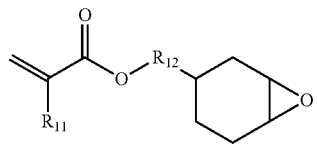

Formula 5

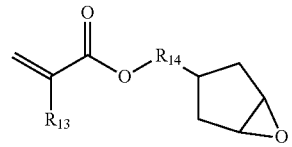

Formula 6

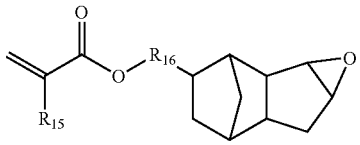

Formula 7

$R_{11}$, $R_{13}$, and $R_{15}$ are the same or different, and hydrogen atoms or $C_1$ to $C_6$ linear or branched alkyl groups, and specific examples may be one selected from the group consisting of a methyl group, an ethyl group, a propyl group, an isopropyl group, an n-butyl group, an isobutyl group, a sec-butyl group, and an n-pentyl group, but it is not limited thereto.

$R_{12}$, $R_{14}$, and $R_{16}$ are the same or different, and $C_1$ to $C_6$ linear or branched alkylenes, and specific examples may be one selected from the group consisting of a methylene group, an ethylene group, a propylene group, an isopropylene group, an n-butylene group, an isobutylene group, a sec-butylene group, and an n-pentylene group, but it is not limited thereto.

However, in order to be used as a color filter protective film for LCD, the compound should have excellent transparency and thus uncolored compounds may be used.

The epoxy group-containing unsaturated compound is present in an amount of about 10 to about 90% by weight based on the total weight of the binder resin, and particularly preferably about 20 to about 70% by weight. When the epoxy group-containing unsaturated compound is present in an amount of less than about 10% by weight, curing does not sufficiently take place and thus the mechanical strength, chemical resistance, heat resistance, and the like of a thermally curable resin film formed may be easily deteriorated. When the epoxy group-containing unsaturated compound is present in an amount of more than about 90% by weight, the amounts of other ethylenic unsaturated compounds and other polymerizable monomers are relatively insufficient and thus it is not enough for the resin film to shown a desired physical property.

The ethylenic unsaturated compound may further include one or more functional groups selected from the group of a hydroxyl group, a silyl group, a functional group exhibiting the acidity by hydrolysis, a carboxylic group, and a carboxylic acid anhydride group.

The functional group exhibiting the acidity by hydrolysis refers to a group which is decomposed in a particular temperature range, preferably in a temperature range of about 150° C. to about 250° C., at which the post-bake of the thermally curable resin composition for a protective film of the present invention is carried out, to produce an acid which may react with an epoxy group in an epoxy group-containing unsaturated compound.

The ethylenic unsaturated compound may be used without limitation as long as it is typically used in the art.

Specifically, examples of an ethylenic unsaturated compound including a hydroxyl group may include 2-hydroxyethyl (meth)acrylate, and the like.

Examples of an ethylenic unsaturated compound including a silyl group may include vinyltrialkoxysilanes such as vinyltrimethoxysilane, vinyltriethoxysilane, and the like, or (meth)acryloxysilanes such as vinyltris(β-methoxyethoxy)silane, methylvinyldimethoxysilane, β(meth)acryloxyethyltrimethoxysilane, β-(meth)acryloxyethyltriethoxysilane, 3-(meth)acryloxypropyltrimethoxysilane, 3-(meth)acryloxypropyltriethoxysilane, γ-(meth)acryloxypropylmethyldimethoxysilane, γ-(meth)acryloxypropyldimethylmethoxysilane, γ-(meth)acryloxypropylmethyldiethoxysilane, 3-(meth)acryloxypropyldimethylethoxysilane, 3-(meth)acryloxypropyltrimethoxysilane, and the like.

Examples of an ethylenic unsaturated compound including the functional group exhibiting the acidity by hydrolysis may include tetrahydro-2H-pyran-2-yl (meth)acrylate, t-butyl (meth)acrylate, and the like.

Examples of an ethylenic unsaturated compound including a carboxylic group may include (meth)acrylic acid, crotonic acid, itaconic acid, maleic acid, fumaric acid, monomethyl maleic acid, isoprene sulfonic acid, styrene sulfonic acid, norbornene-2-carboxylic acid, and the like.

Examples of an ethylenic unsaturated compound including an acid anhydride group may include (meth)acrylic anhydride, crotonic anhydride, itaconic anhydride, maleic anhydride, fumaric anhydride, monomethyl maleic anhydride, isoprene sulfonic acid anhydride, styrene sulfonic acid anhydride, norbornene-2-carboxylic acid anhydride, and the like.

The ethylenic unsaturated compound is present in an amount of about 5 to about 50% by weight based on the total weight of the binder resin, and particularly preferably about 10 to about 40% by weight. When the ethylenic unsaturated compound is present in an amount of less than about 5% by weight, a desired curing does not sufficiently take place. When the ethylenic unsaturated compound is present in an amount of more than about 50% by weight, the binder resin is not easily polymerized due to deteriorated stability during the polymerization.

In addition, the binder resin of the present invention may include other polymerizable monomers besides the components, if necessary.

As the other polymerizable monomers, monomers known in the art may be used without limitation as long as they are monomers which are polymerizable with the epoxy group-containing unsaturated compound or the ethylenic unsaturated compound.

Non-limiting examples may include aliphatic or aromatic (meth)acrylates such as benzyl (meth)acrylate, phenyl (meth)acrylate, cyclohexyl (meth)acrylate, methyl (meth)acrylate, ethyl (meth)acrylate, n-butyl (meth)acrylate, 2-ethylhexyl (meth)acrylate, dicyclopentanyl (meth)acrylate, and the like; caprolactone modified (meth)acrylates such as TONE M-100, TONE M-101, TONE M-201 (products from DOW Chemical Company), FM-1, FM-2, FM-3 (products from Daicel UCB Co. Ltd), and the like; styrene monomers such as styrene, 4-methoxystyrene, 4-methylstyrene, and the like; and conjugated diene-based compounds such as 1,3-butadiene or isoprene, and the like.

The other polymerizable monomers may be variously used in order to appropriately control physical properties of a thermally curable resin paint film obtained from a thermally curable resin composition, such as mechanical strength, adhesion, planarizability, and the like, and the monomer is present in an amount of preferably about 1 to about 50% by weight based on the binder resin of the present invention.

The weight average molecular weight (Mw) of a binder resin according to the present invention is appropriately in a range of about 2,000 to about 100,000 in terms of polystyrene standards, and particularly preferably about 3,000 to about 50,000. When the molecular weight is about 2,000 or less, the film performance of a thermally curable resin composition for a protective film are easily deteriorated. When the molecular weight is about 100,000 or more, the copolymer may not be easily handled and the planarizability may be deteriorated.

As a solvent included in a thermally curable resin composition according to the present invention, solvents known in the art may be used. Non-limiting examples of the solvents may include alkyl ketones such as methylethylketone, cyclohexanone, and the like; ethers such as tetrahydrofuran, and the like; ethylene glycol alkyl ether acetates such as methyl cellosolve acetate, ethyl cellosolve acetate, ethylene glycol butyl ether acetate, and the like; propylene glycol alkyl ether acetates such as propylene glycol methyl ether acetate, propylene glycol ethyl ether acetate, propylene glycol propyl ether acetate, and the like; ethylene glycols such as butyl cellosolve, 2-methoxyethyl ether, ethylene glycol ethyl methyl ether, ethylene glycol diethyl ether, and the like; esters such as ethyl acetate, ethyl lactate, ethyl 3-ethoxypropionate, and the like; or a combination thereof, and the like.

Other additives optionally added to the thermally curable resin compound for a protective film may be used without limitation as long as they are typically used in the art according to other use purposes, such as film performance, adhesion with a substrate, chemical stability, and the like, and other additives, such as polyfunctional monomers, adhesion aiding agents, surfactants, thermal polymerization inhibitors, and the like may be used as non-limiting examples within the range of not affecting characteristics, such as planarizability, transmittance, heat resistance, and the like.

The polyfunctional monomer may be used without limitation as long as it is a compound having 2 to 6 unsaturated functional groups, and non-limiting examples of the monomers may include polyfunctional (meth)acrylates, such as ethylene glycol di(meth)acrylate, propylene glycol di(meth)acrylate, 1,3-butanediol di(meth)acrylate, neopentyl glycol di(meth)acrylate, 1,6-hexanediol di(meth)acrylate, trimethylolpropane tri(meth)acrylate, pentaerythritol di(meth)acrylate, pentaerythritol tri(meth)acrylate, pentaerythritol tetra (meth)acrylate, dipentaerythritol penta(meth)acrylate, dipentaerythritol hexa(meth)acrylate, and the like.

The unsaturated functional group employs a polyfunctional monomer which is a compound with 2 to 6 functional groups because each functional group of the polyfunctional monomer may be cross-linked with another polyfunctional monomer to form a network structure, enhancing the strength and chemical resistance of a cured film.

The polyfunctional monomer may be used in an amount of about 1 to about 200 parts by weight based on 100 parts by weight of the binder resin, and preferably about 5 to about 100 parts by weight. The polyfunctional monomer which is a cross-linkable compound has a lower molecular weight than that of the binder resin of the present invention, and is effective in enhancing the planarizability. In particular, when the polyfunctional monomer is used within the range, the capability of forming a paint film is excellent and a pain film formed is not sticky.

The adhesion aiding agent is a compound which enhances the adhesion property on a support base, is not particularly limited as long as the agent satisfies the object, and typically employs a silane-based compound. Non-limiting examples of silane-based compounds include methcryloxypropyl trimethoxysilane, γ-glycydoxy propyl trimethoxysilane, β-(3,4-epoxycyclohexyl)ethyl treimethoxysilane, γ-mercaptopropyl trimethoxysilane, vinyltriacetoxysilane, vinyltrimethoxysilane, and a mixture thereof.

The adhesion aiding agent may be used in an amount of about 30 or less parts weight based on 100 parts by weight of the binder resin, and particularly preferable about 20 or less parts by weight in terms of paint film property and stability.

Other additives include components which are generally used in a coating solution, such as surfactants, thermal polymerization inhibitors, and the like. Non-limiting examples of the surfactants may include fluorine- or silicon-based surfactants, and non-limiting examples of the thermal polymerization inhibitors may include hydroquinone, 4-methoxyphenol, quinine, pyrocatechol, t-butyl catechol, phenothiazine, and the like.

The solid content of thermally curable resin composition for a protective film according to the present invention may be appropriately selected according to a method of forming a film and its purpose, and the composition is present in an amount of preferably about 1 to about 60% by weight, and more preferably about 5 to about 40% by weight particularly in terms of coatability.

The thermally curable resin composition for a protective film according to the present invention may be a one-component type in terms of efficiency in forming a protective film.

A thermally curable protective film may be formed from a thermally curable resin composition for a protective film according to the present invention by methods conventionally known in the art.

A method for forming the thermally curable protective film will be described according to an embodiment.

The thermally curable resin composition for a protective film is applied on a substrate by an appropriate method, prebaked to remove the solvent and form an applied film, and followed by post bake to form a thermally curable protective film.

The application method of the composition is not particularly limited, a spray method, a roll coating method, a spin coating method, a slit nozzle coating method, and the like may be used, and the spin coating method is generally used. Depending on situations, some of the residual solvent may be removed under reduced pressure before the prebake is performed after the application.

Conditions of the prebake are different from those of the postbake according to the composition used and its use purpose. For example, the prebake may be performed typically at about 60° C. to about 130° C. for 0.5 to 5 min. In addition, the postbake may be performed typically in a temperature range of about 150° C. to about 250° C. for 10 min to 2 hrs. Furthermore, each of the prebake and postbake may be performed in one step or a combination thereof. In the postbake step, an epoxy group in a binder resin is reacted with an acid group decomposed to form a protective film with a network structure.

A protective film formed by the method has excellent planarizability, a high surface hardness, and excellent chemical resistances, such as heat resistance, acid resistance, alkali resistance, and the like. Therefore, the protective film is useful as a material for a protective film of a color filter for a liquid crystal display device.

In addition, the present invention provides a liquid crystal display device which includes a color filter including the protective film. The liquid crystal display device includes a black matrix and a color filter, and may be manufactured by typical methods known in the art.

Hereinafter, the present invention will be described in more detail with reference to Synthetic Examples and Examples. However, the present invention is not limited thereto.

Synthetic Examples of Binder Resins

Synthetic Example 1

23 parts by weight of methacrylic acid, 50 parts by weight of glycidyl methacrylate, 27 parts by weight of styrene, and 200 parts by weight of propylene glycol methyl ether acetate are added to a flask with a nitrogen inlet, the flask was heated to about 90° C., 4.0 parts by weight of azobis valeronitrile (AVN) were added to the flask, and the temperature was maintained for 6 hrs to obtain a polymer solution. The polymer solution was added dropwise to a large excess of hexane to form a precipitate and dried under vacuum to obtain a binder resin. The weight average molecular weight (Mw) of the copolymer (A1) in terms of polystyrene standards was about 13,100.

Synthetic Example 2

Instead of using 23 parts by weight of methacrylic acid, 50 parts by weight of glycidyl methacrylate, and 27 parts by weight of styrene, 15 parts by weight of methacrylic acid, 45 parts by weight of glycidyl methacrylate, 25 parts by weight of styrene, and 15 parts by weight of dicyclopentanyl methacrylate were used in the same manner in Synthetic Example 1 to obtain a copolymer (A2) with a weight average molecular weight (Mw) of about 11,500 in terms of polystyrene standards.

Synthetic Example 3

Instead of using 23 parts by weight of methacrylic acid, 50 parts by weight of glycidyl methacrylate, and 27 parts by weight of styrene, 20 parts by weight of 2-tetrahydro-2H-pyran-2-yl, 41 parts by weight of glycidyl methacrylate, 21 parts by weight of styrene, and 18 parts by weight of dicyclopentanyl methacrylate were used in the same manner in Synthetic Example 1 to obtain a copolymer (A2) with a weight average molecular weight (Mw) of about 10,500 in terms of polystyrene standards.

Synthetic Examples of Alkoxy Group-Containing Silane-Modified Epoxy Resins

Synthetic Example 4

75 parts by weight of 3-glycidoxypropyl trimethoxysilane and 25 parts by weight of methyltriethoxysilane were added to a flask with a nitrogen inlet, subsequently a solution into which 20 parts by weight of an aqueous solution, in which 0.1 part by weight of sodium hydroxide was added to 100 parts by weight of propylene glycol methyl ether acetate, are introduced is added to the flask, the flask was heated to about 70° C., and the temperature was maintained for 6 hrs.

After the reaction, methanol produced by hydrolysis was removed at a reduced pressure of about 50 mmHg for 2 hrs to obtain an alkoxy group-containing silane-modified epoxy resin (B1) with a weight average molecular weight (Mw) of about 3,300 in terms of polystyrene standards.

Synthetic Example 5

Instead of using 75 parts by weight of 3-glycidoxypropyl trimethoxy silane, 75 parts by weight of N-glycidyl-N,N-bis[3-(methyldimethoxysilyl)propyl]amine were used in the same manner as in Synthetic Example 4 to obtain an alkoxy group-containing silane-modified epoxy resin (B2) with a weight average molecular weight (Mw) of about 4,100 in terms of polystyrene standards.

Comparative Synthetic Examples of Binder Resins

Comparative Synthetic Example 1

50 parts by weight of methyl methacrylate, 50 parts by weight of glycidyl methacrylate, and 270 parts by weight of cyclohexanone were added to a flask with a nitrogen inlet, the flask was heated to about 80° C., 5 parts by weight of azobisisobutyronitrile were added to the flask, and the temperature was maintained for 3 hrs to obtain a polymer solution including a copolymer (P1). The polymer solution was added dropwise to a large excess of hexane to form a precipitate and dried under vacuum to obtain a binder resin. The weight average molecular weight (Mw) of the copolymer (P1) was about 8,400.

Comparative Synthetic Example 2

20 parts by weight of methacrylic acid, 20 parts by weight of glycidyl methacrylate, 20 parts by weight of styrene, and 20 parts by weight of tetrahydro-2H-pyran-2-yl, 20 parts by weight of N-cyclohexylmaleimide, and 200 parts by weight of propylene glycol methyl ether acetate are added to a flask with a nitrogen inlet, the flask was heated to about 70° C., 5 parts by weight of azobis(2,4-dimethyl)valeronitrile were added to the flask, and the temperature was maintained for 5 hrs to obtain a polymer solution including a copolymer (P2). The polymer solution was added dropwise to a large excess of hexane to form a precipitate and dried under vacuum to obtain a binder resin. The weight average molecular weight (Mw) of the copolymer (P2) in terms of polystyrene standards was about 10,500.

Comparative Synthetic Examples of Alkoxy Group-Containing Silane Modified Epoxy Resins Comparative Synthetic Example 3

70 parts by weight of 3-glycidoxypropyl trimethoxysilane, 17 parts by weight of phenyltrimethoxysilane, and 13 parts by weight of diphenyldimethoxysilane were added to a flask with a nitrogen inlet, subsequently 20 parts by weight of an aqueous solution, in which 0.1 part by weight of sodium hydroxide was added to 100 parts by weight of propylene glycol methyl ether acetate, are added to the flask, the flask was heated to about 60° C., and the temperature was maintained for 6 hrs.

After the reaction, methanol produced by hydrolysis was removed at a reduced pressure of about 50 mmHg for 2 hrs to obtain an alkoxy group-containing silane-modified epoxy resin (Q1) with a weight average molecular weight (Mw) of about 4,400 in terms of polystyrene standards.

Comparative Synthetic Example 4

61 parts by weight of 3-glycidoxypropyl trimethoxysilane, 39 parts by weight of tetramethoxysilane, and 129 parts by weight of propylene glycol methyl ether were added to a flask with a nitrogen inlet, the flask was heated to about 60° C., 11 parts by weight of an aqueous solution in which 0.1 part by weight of oxalic acid was added were added to the flask, and the temperature was maintained for 4 hrs.

A purification was performed in the same manner as in Comparative Synthetic Example 3 to obtain an alkoxy group-containing silane-modified epoxy resin (Q2) with a weight average molecular weight (Mw) of about 13,000 in terms of polystyrene standards.

Example 1

100 parts by weight of the copolymer (A1) prepared in Synthetic Example 1, 5 parts by weight of the alkoxy group-containing silane-modified epoxy resin (B1) prepared in Synthetic Example 4, 400 parts by weight of propylene glycol methyl ether acetate, and 0.1 part by weight of a surfactant BYK331 (BYK) as an additive were mixed, and followed by filtration using a filter with a diameter of about 0.2 μm to obtain a thermally curable resin composition for a protective film.

The thermally curable resin composition for a protective film was applied on a glass substrate, dried at about 90° C. on a hot plate as a prebake for 2 min, and subsequently followed by, a postbake at about 220° C. in an oven for 30 min to form a protective film with a thickness of about 2.0 μm.

Example 2

The same process as in Example 1 was performed to prepare a thermally curable resin composition for a protective film and a protective film, except that the copolymer (A2) prepared in Synthetic Example 2 was used instead of the copolymer (A1).

Example 3

The same process as in Example 1 was performed to prepare a thermally curable resin composition for a protective film and a protective film, except that the copolymer (A3) prepared in Synthetic Example 3 was used instead of the copolymer (A1).

Example 4

The same process as in Example 1 was performed to prepare a thermally curable resin composition for a protective film and a protective film, except that 30 parts by weight of dipentaerythritol hexaacrylate were separately added.

Example 5

The same process as in Example 1 was performed to prepare a thermally curable resin composition for a protective film and a protective film, except that the alkoxy group-containing silane-modified epoxy silane (B2) prepared in Synthetic Example 5 was used instead of the alkoxy group-containing silane-modified epoxy silane (B1).

Comparative Example 1

The same process as in Example 1 was performed to prepare a thermally curable resin composition for a protective film and a protective film, except that the alkoxy group-containing silane-modified epoxy silane (B1) was not used.

Comparative Example 2

The same process as in Example 4 was performed to prepare a thermally curable resin composition for a protective film and a protective film, except that the alkoxy group-containing silane-modified epoxy silane (B1) was not used.

Comparative Example 3

The same process as in Example 1 was performed to prepare a thermally curable resin composition for a protective film and a protective film, except that the 100 parts by weight of the copolymer (P1) prepared in Comparative Synthetic Example 1, 23 parts by weight of the alkoxy group-containing silane-modified epoxy resin (Q1) prepared in Comparative Synthetic Example 3, and 33 parts by weight of trimellitic anhydride were used instead of the copolymer (A1), the alkoxy group-containing silane-modified epoxy resin (B1), and the surfactant BYK331 (BYK).

Comparative Example 4

The same process as in Example 1 was performed to prepare a thermally curable resin composition for a protective film and a protective film, except that the 100 parts by weight of the copolymer (P2) prepared in Comparative Synthetic Example 2, 20 parts by weight of the alkoxy group-containing silane-modified epoxy resin (Q2) prepared in Comparative Synthetic Example 4, 40 parts by weight of hexahydrophthalic acid anhydride and 0.1 part by weight of SH-28PA (prepared by Toray Dow Corning Silicone Co., Ltd.) as a surfactant were used instead of the copolymer (A1), the alkoxy group-containing silane-modified epoxy resin (B1), and the surfactant BYK331 (BYK).

Experimental Example

1. Adhesive Strength

A pressure cooker test (120° C., humidity 100%, and 4 hours) was performed by a method using ASTM-D3359, 100 grids were formed on the protective film with a cutter knife by a grid tape method, and then a peeling off was performed with a tape. Then, the number of grid patterns which were not peeled off among the 100 grid patterns was measured.

2. Surface Hardness

The pencil hardness of the protective film was measured by a method using ASTM-D3363 and the results thereof were recorded in the following Table 1.

3. Transmittance

A light at a wavelength of about 400 nm passed through a glass substrate on which the protective film was formed and the results thereof were recorded in the following Table 1.

4. Storage Stability

The viscosity of the thermally curable resin composition for a protective film was measured by using a capillary viscometer. Subsequently, the composition was allowed to stand at about 25° C. for 2 weeks, and then the rate of change over the initial viscosity was shown in the following Table 1.

5. Processability

The processability of a thermally curable resin composition for a protective film according to the type of an alkoxy group-containing silane-modified epoxy resin was shown in Table 1.

When an alkoxy group-containing silane modified epoxy resin was produced in a sol form, a thermally curable resin composition for a protective film including the resin was excellent in processability. However, when the alkoxy group-containing silane modified epoxy resin was produced in a gel form, the processability of the thermally curable resin composition for a protective film including the resin was deteriorated.

6. Compatibility

The compatibility of a thermally curable resin composition for a protective film according to the type of an alkoxy group-containing silane-modified epoxy resin was shown in Table 1.

When the molecular weight of an alkoxy group-containing silane-modified epoxy resin exceeds about 10,000, a thermally curable resin composition for a protective film including the resin exhibited a deteriorated compatibility with a thermally curable resin for a protective film to have a cloudy solution or a cloudy film formed (haze generation).

7. Acid Resistance

A glass substrate on which a protective film was formed was each immersed in a HCl 5.0 wt % aqueous solution at about 30° C. for 30 min and removed from the solution, and the change in the exterior layer of the protective film was observed to evaluate the acid resistance. Then, a glass substrate with no change in the exterior layer was evaluated as good (O) and a glass substrate with its exterior layer peeled off or discolored to white was evaluated as bad (X). The results thereof were shown in the following Table 1.

8. Alkali Resistance

A glass substrate on which a protective film was formed was each immersed in a NaOH 5.0 wt % aqueous solution at about 30° C. for 30 min and removed from the solution, and the change in the exterior layer of the protective film was observed to evaluate the alkali resistance. Then, a glass substrate with no change in the exterior layer was evaluated as good (O) and a glass substrate with its exterior layer peeled off or discolored to white was evaluated as bad (X). The results thereof were shown in the following Table 1.

9. Solvent Resistance

A glass substrate on which a protective film was formed was each immersed in a NMP solution at about 40° C. for 10 min and the change in thickness was observed to evaluate the solvent resistance. Then, a glass substrate with a change in thickness of about 3% or less was evaluated as good (O) and a glass substrate with a change in thickness of more than about 3% was evaluated as bad (X). The results thereof were shown in the following Table 1.

TABLE 1

| Division | | Adhesive strength | Surface hardness | Transmittance | Storage stability | Processability | Compatibility | Chemical resistance | | |
|---|---|---|---|---|---|---|---|---|---|---|
| | | | | | | | | Acid resistance | Alkali resistance | Solvent resistance |
| Example | 1 | 100 | 5H | >98% | <5% | Excellent | Excellent | O | O | O |
| | 2 | 100 | 5H | >98% | <5% | Excellent | Excellent | O | O | O |
| | 3 | 100 | 5H | >98% | <5% | Excellent | Excellent | O | O | O |
| | 4 | 100 | 6H | >98% | <5% | Excellent | Excellent | O | O | O |
| | 5 | 100 | 6H | >98% | <5% | Excellent | Excellent | O | O | O |
| Comparative | 1 | 2 | 4H | >98% | <5% | — | — | O | O | O |
| Example | 2 | 1 | 4H | >98% | <5% | — | — | O | O | O |
| | 3 | 100 | 4H | <98% | <5% | Excellent | Excellent | O | O | O |
| | 4 | 95 | 6H | >98% | >5% | Bad | Haze generation | O | O | O |

The protective films in Examples 1 to 5 exhibit excellent adhesive strength by using an optimized alkoxy group-containing silane-modified epoxy resin according to the present invention, while the protective films in Comparative Examples 1 and 2, in which no alkoxy group-containing silane-modified epoxy resin was used, had a very deteriorated adhesive strength.

In Comparative Example 3, the content of an alkoxy group-containing silane-modified epoxy resin included in a thermally curable resin composition for a protective film was higher than those in Examples 1 to 5. When the alkoxy group-containing silane-modified epoxy resin was used in a large amount, it was confirmed that the transmittance was decreased.

In Comparative Example 4, tetramethoxysilane was used in the preparation of an alkoxy group-containing silane-modified epoxy resin included in a thermally curable resin composition for a protective film. The rate of a preparation reaction of an alkoxy group-containing silane-modified epoxy resin (Q2) using tetramethoxysilane was so fast that it was not easy to prepare the resin.

In addition, the molecular weight of the alkoxy group-containing silane-modified epoxy resin (Q2) prepared by using the tetramethoxysilane from Comparative Example 4 was about 10,000 or more, and thus it was confirmed that there is a limitation in its compatibility with the thermally curable resin and the storage stability of the thermally curable resin composition for a protective film including the epoxy resin was deteriorated.

Conversely, the alkoxy group-containing silane-modified epoxy resins (B1 and B2) used in Examples 1 to 5 were produced in a sol form, and thus it was very easy to mix the resins with the thermally curable resin composition for a protective film.

It was confirmed through these Examples and Experimental Examples that a protective film according to the present invention drastically improved the adhesive strength while maintaining the film strength and other physical properties.

The present invention may provide a protective film of a color filter by using a thermally curable resin composition for a protective film including an alkoxy group-containing silane modified epoxy resin, and the protective film may have excellent film strength and excellent adhesive strength with color filter layers present in the upper and lower portions of the protective film, a column spacer, or an ITO layer to be useful for a large area LCD.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A thermally curable resin composition for a protective film, comprising about 0.5 to about 30% by weight of an alkoxy group-containing silane-modified epoxy resin obtained by reacting an epoxy compound having a silyl group represented by Formula 3 with an alkoxy silane represented by Formula 2 based on a total weight of a solid content, a binder resin and a solvent,
   wherein the binder resin is a copolymer of an epoxy group-containing unsaturated compound, an ethylenic unsaturated compound, and other polymerizable monomers as optional compounds, and
   wherein the binder resin is prepared by copolymerization of 20 to 70% by weight of an epoxy group-containing unsaturated compound, 10 to 40% by weight of an ethylenic unsaturated compound, and 1 to 50% by weight of other polymerizable monomers:

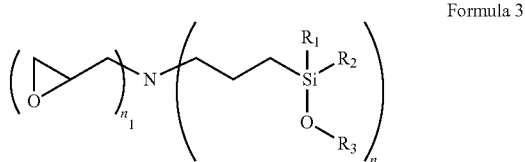

Formula 3

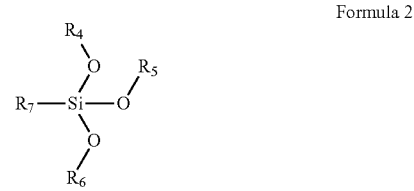

Formula 2

$R_1$ and $R_2$ are the same or different, and $C_1$ to $C_6$ alkyl groups or $C_1$ to $C_6$ alkoxy groups, $R_3$, $R_4$, $R_5$, and $R_6$ are the same or different, and $C_1$ to $C_6$ alkyl groups, and $R_7$ is one selected from the group consisting of a $C_1$ to $C_6$ alkyl group, a $C_2$ to $C_6$ vinyl group, a $C_2$ to $C_6$ vinyl alkyl group, a $C_1$ to $C_6$ mercapto alkyl group, and a $C_6$ to $C_{12}$ aryl group, $n_1$ and $n_2$ are each 1 or 2, and $n_1+n_2=3$.

2. The composition of claim 1, wherein the epoxy compound having a silyl group is mixed with the alkoxy silane at a weight ratio of about 5:1 to about 1:1.

3. The composition of claim 1, wherein the alkoxy group-containing silane-modified epoxy resin has a weight average molecular weight in a range of about 1,000 to about 10,000 in terms of polystyrene standards.

4. The composition of claim 1, wherein the epoxy compound is one or more selected from the group consisting of 3-(N,N-diglycidyl)aminopropyltrimethoxysilane, N-glycidyl-N,N-bis[3-(methyldimethoxysilyl)propyl]amine, and N-glycidyl-N,N-bis[3-(trimethoxysilyl)propyl]amine.

5. The composition of claim 1, wherein the alkoxy silane is one or more selected from the group consisting of methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, phenyltrimethoxysilane, phenyltriethoxysilane, vinyltrimethoxysilane, vinyltriethoxysilane, 3-mercaptopropyltrimethoxysilane, and 3-mercaptopropyltriethoxysilane, or a partial condensate thereof.

6. The composition of claim 1, wherein the epoxy group-containing unsaturated compound is an aliphatic epoxy group-containing unsaturated compound selected from the group consisting of allyl glycidyl ether, glycidyl 5-norbornene-2-methyl-2-carboxylate (endo and exo mixtures), 1,2-epoxy-5-hexene, 1,2-epoxy-9-decene, glycidyl(meth)acrylate, glycidyl α-ethyl(meth)acrylate, glycidyl α-n-propyl(meth)acrylate, glycidyl α-n-butyl(meth)acrylate, 3,4-epoxybutyl(meth)acrylate, 4,5-epoxypentyl(meth)acrylate, 5,6-epoxyheptyl(meth)acrylate, 6,7-epoxyheptyl α-ethylacrylate, and methylglycidyl (meth)acrylate; or an alicyclic epoxy group-containing unsaturated compound selected from the group consisting of compounds represented by the following Formulas 4 to 6; or a mixture thereof;

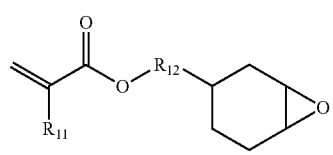

Formula 5

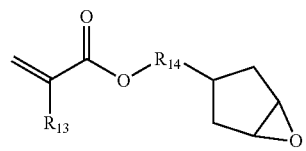

Formula 6

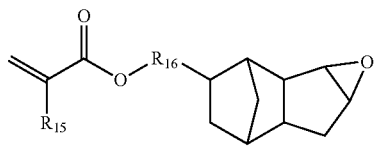

Formula 7

(wherein, $R_{11}$, $R_{13}$, and $R_{15}$ are the same or different, and hydrogen or $C_1$ to $C_6$ alkyl groups, and $R_{12}$, $R_{14}$, and $R_{16}$ are the same or different, and $C_1$ to $C_6$ alkylenes).

7. The composition of claim 1, wherein the ethylenic unsaturated compound further comprises one or more functional groups selected from the group consisting of a hydroxyl group, a silyl group, a functional group exhibiting the acidity by hydrolysis, a carboxylic group, and a carboxylic acid anhydride group.

8. The composition of claim 7, wherein the ethylenic unsaturated compound comprising a hydroxyl group is 2-hydroxyethyl (meth)acrylate;

the ethylenic unsaturated compound comprising a silyl group is selected from the group consisting of vinyltrimethoxysilane, vinyltriethoxysilane, vinyltris(β-methoxyethoxy)silane, methylvinyldimethoxysilane, β-(meth)acryloxyethyltrimethoxysilane, β-(meth)acryloxyethyltriethoxysilane, 3-(meth)acryloxypropyltrimethoxysilane, 3-(meth)acryloxypropyltriethoxysilane, γ-(meth)acryloxypropylmethyldimethoxysilane, γ-(meth)acryloxypropyldimethylmethoxysilane, γ-(meth)acryloxypropylmethyldiethoxysilane, 3-(meth)acryloxypropyldimethylethoxysilane, and 3-(meth)acryloxypropyltrimethoxysilane;

the ethylenic unsaturated compound comprising an functional group exhibiting the acidity by hydrolysis, is selected from the group consisting of tetrahydro-2H-pyran-2-yl (meth)acrylate and t-butyl(meth)acrylate;

the ethylenic unsaturated compound comprising a carboxylic group is selected from the group consisting of (meth)acrylic acid, crotonic acid, itaconic acid, maleic acid, fumaric acid, monomethyl maleic acid, isoprene sulfonic acid, styrene sulfonic acid, and norbornene-2-carboxylic acid; and the ethylenic unsaturated compound comprising an acid anhydride group is selected from the group consisting of (meth)acrylic anhydride, crotonic anhydride, itaconic anhydride, maleic anhydride, fumaric anhydride, monomethyl maleic anhydride, isoprene sulfonic acid anhydride, styrene sulfonic acid anhydride, and norbornene-2-carboxylic acid anhydride.

9. The composition of claim 1, wherein the other polymerizable monomers are one or more selected from the group consisting of benzyl (meth)acrylate, phenyl (meth)acrylate, cyclohexyl (meth)acrylate, methyl (meth)acrylate, ethyl (meth)acrylate, n-butyl (meth)acrylate, 2-ethylhexyl (meth)acrylate, dicyclopentanyl (meth)acrylate, caprolactone modified (meth)acrylate, styrene, 4-methoxystyrene, 4-methylstyrene, 1,3-butadiene, and isoprene.

10. The composition of claim 1, wherein the binder resin has a weight average molecular weight (Mw) of about 2,000 to about 100,000 in terms of polystyrene standards.

11. The composition of claim 1, wherein the solvent is one or more selected from the group consisting of methylethylketone, cyclohexanone, tetrahydrofuran, methyl cellosolve acetate, ethyl cellosolve acetate, ethylene glycol butyl ether acetate, propylene glycol methyl ether acetate, propylene glycol ethyl ether acetate, propylene glycol propyl ether acetate, butyl cellosolve, 2-methoxyethyl ether, ethylene glycol ethyl methyl ether, ethylene glycol diethyl ether, ethyl acetate, ethyl lactate, and ethyl 3-ethoxypropionate.

12. The composition of claim 1, further comprising one or more other additives selected from the group consisting of a polyfunctional monomer, an adhesion aiding agent, a surfactant, and a thermal polymerization inhibitor.

13. The composition of claim 1, wherein the thermally curable resin composition for a protective film comprises a solid in an amount of about 1 to about 60% by weight.

14. The composition of claim of claim 1, wherein the thermally curable resin composition for a protective film is a one-component type.

15. A protective film of a color filter formed from the thermally curable resin composition for a protective film of claim 1.

16. A liquid crystal display device comprising the protective film of a color filter of claim 15.

* * * * *